US012418089B1

(12) United States Patent
Tsironis

(10) Patent No.: US 12,418,089 B1
(45) Date of Patent: Sep. 16, 2025

(54) SUB-THz VECTOR LOAD PULL TUNER

(71) Applicant: Christos Tsironis, St-Laurent (CA)

(72) Inventor: Christos Tsironis, Kirkland (CA)

( * ) Notice: Subject to any disclaimer, the term of this patent is extended or adjusted under 35 U.S.C. 154(b) by 724 days.

(21) Appl. No.: 17/725,728

(22) Filed: Apr. 21, 2022

(51) Int. Cl.
*H01P 5/18* (2006.01)
*H01P 5/04* (2006.01)
*H01P 5/19* (2006.01)

(52) U.S. Cl.
CPC ................ *H01P 5/182* (2013.01); *H01P 5/04* (2013.01); *H01P 5/19* (2013.01)

(58) Field of Classification Search
CPC ............... H01P 5/182; H01P 5/04; H01P 5/19
See application file for complete search history.

(56) References Cited

U.S. PATENT DOCUMENTS 7,282,926 B1 10/2007 Verspecht et al.
8,896,401 B1 11/2014 Tsironis
2011/0204906 A1* 8/2011 Tsironis ............. G01R 29/0878 324/750.01

FOREIGN PATENT DOCUMENTS

WO WO-2013020969 A1 * 2/2013 ............. G01R 31/00

OTHER PUBLICATIONS

Directional Couplers [online], Microwaves101 [retrieved on Oct. 17, 2018]. Retrieved from Internet <URL: microwaves101.com/encyclopedia/directionalcouplers.cfm>.
"Basics of S-Parameters, part 1", Sischka, Franz, Characterization handbook, Mar. 2002.
"Waveguide loop-type directional coupler using a coupling conductor with protuberances", 2015 European Microwave Conference (EuMC), Paris 2015 https://www.semanticscholar.org/paper/Waveguide-loop-type-directional-coupler-using-a-Ishibashi-Kurihara/8934a277fcd1c7b35ce824eab9642658f29a0228.
What is a Vector Network Analyzer, VNA: the basics, [online], electronics notes [retrieved on Jul. 13, 2020]. Retrieved from Internet <URL:www.electronics-notes.com/articles/test-methods/rf-vector-network-analyzer-vna/what-is-a-vna.php>.

* cited by examiner

*Primary Examiner* — Andrea Lindgren Baltzell
*Assistant Examiner* — Kimberly E Glenn

(57) ABSTRACT

Wideband waveguide slot-based bi-directional couplers are combined with waveguide load pull tuners for true vector load pull at sub-THz frequencies. Coupling is constant and Directivity is above average up to 170 GHz and can be extended to 330 GHz and are controlled by the shape, size, and configuration of the slots between the main tuner waveguide and the adjacent coupler waveguide. A calibration method allows full characterization of the coupler-tuner assembly.

13 Claims, 12 Drawing Sheets

FIG. 1: Prior art

FIG. 2: Prior art

FIG. 3 : Prior art

SUB-THz VECTOR LOAD PULL TUNER

PRIORITY CLAIM

Not Applicable

CROSS-REFERENCE TO RELATED ARTICLES

1. Directional Couplers [online], Microwaves101 [retrieved on 2018 Oct. 17]. Retrieved from Internet <URL: http://www.microwaves101.com/encyclopedia/directionalcouplers.cfm>.
2. "Basics of S-Parameters, part 1", SISCHKA, Franz, Characterization handbook, March 2002.
3. VERSPECHT, J. et al. U.S. Pat. No. 7,282,926, "Method and an apparatus for characterizing a High-Frequency Device-Under-Test in a Large Signal Impedance.
4. "Waveguide loop-type directional coupler using a coupling conductor with protuberances", 2015 European Microwave Conference (EuMC), Paris 2015 https://www.semanticscholar.org/paper/Waveguide-loop-type-directional-coupler-using-a-Ishibashi-Kurihara/8934a277fcd1c7b35ce824eab9642658f29a0228
5. "A Note on Coaxial Bethe-Hole Directional Couplers", Proceedings of the IRE, 38 (3), 305-309. https://ieeexplore.ieee.org/abstract/document/1701224.
6. TSIRONIS, C. U.S. Pat. No. 8,896,401," Calibration and tuning using compact multi frequency-range impedance tuners".
7. "What is a Vector Network Analyzer, VNA: the basics, [online], electronics notes [retrieved on 2020 Jul. 13]. Retrieved from Internet <URL: https://www.electronics-notes.com/articles/test-methods/rf-vector-network-analyzer-vna/what-is-a-vna.php>.

BACKGROUND OF THE INVENTION

This invention relates to sub-Terahertz (THz) testing of transistors (device under test: DUT). The electrical signals injected into the input of the DUT and extracted from the output can be sampled and measured using signal sampling devices (directional couplers, see ref. 1 and 5) and processed by appropriate signal vector analyzers (see ref. 7).

DESCRIPTION OF PRIOR ART

A typical test setup allowing sampling electrical signals at the input and output of a DUT in linear and nonlinear operation regime is shown in FIG. 1. In this setup the source and load impedances are nominally 5002 (the standard characteristic impedance Zo of microwave transmission lines). The input and output signal couplers (see ref. 3) extract a small portion of the RF forward and reverse power waves a(t) and b(t), which are injected into and extracted from the DUT, and transfers them into the tuned signal receiver (Vector Network Analyzer, VNA, see ref. 7), which measures the fundamental and harmonic components of it and may display the RF characteristics as well as the time function, using frequency-to-time inverse Fourier transformation. A tuner-coupler assembly allowing measuring the forward and reverse travelling waves a(t) and b(t) as a function of the reflection factor (RF impedance) presented to the DUT is called a "tuner for vector load pull" or "vector load pull tuner".

Directional signal couplers have been known for a long time (see ref. 1, 5). Waveguide directional couplers use sections of waveguide transmission lines and several slots or holes to allow small amounts of energy to leak into and excite wave generation and propagation inside a secondary adjacent waveguide (see ref. 5). The form, size and positioning of the slots or holes allows various coupling and directivity (that is the ratio between forward and reverse wave propagation) values. The main disadvantage of waveguide-to-waveguide couplers, as used in this invention, is their (typically) big size at low frequencies below 60 GHZ, and because of that their main application is in millimeter and sub-THz frequency range between 110 and 330 GHz (0.11 to 0.33 THz). Directional signal couplers are, by principle, bi-directional, having a coupled and an isolated port; if the isolated port is not used, as is the case in scalar load pull and other applications, where the phase of the signal is not needed, then the isolated port is terminated with the characteristic impedance (Zo) and ignored; the coupler becomes uni-directional. In this work the couplers are bi-directional.

BRIEF DESCRIPTION OF THE INVENTION

This invention discloses a vector load pull tuner combining an integrated, compact and wideband, rectangular waveguide bi-directional signal coupler with a waveguide load-pull tuner. The signal coupler is made by attaching a secondary waveguide to a main waveguide, which is used to create the tuner, and extract a small portion (1% to 0.1%) of the signal power from the main waveguide into the secondary waveguide using holes of various number, forms, and disposition between the two waveguides allowing energy leakage. However, electro-magnetic waves do not propagate amorphously, they follow the strict rules of Maxwell's wave propagation; the points across the communication holes excite wave propagation in the secondary waveguide and proper hole design, spacing and configuration allows obtaining adequate frequency coverage, coupling and directivity; in the remaining section, beyond the area of the slots or holes, of the main waveguide we create a load pull tuner, by cutting a longitudinal slot along the main waveguide and inserting a mobile conductive reflective probe inside this slot, to create a controlled reflection factor. The assembly allows vector load pull operation, because the bi-directional waveguide coupler allows measuring incident and reflected power waves into the DUT and thus calculating a large signal DUT impedance and delivered power and therefore the true power added efficiency (PAE), which a scalar load-pull system without a bi-directional coupler between tuner and DUT cannot do.

BRIEF DESCRIPTION OF THE SEVERAL VIEWS OF THE DRAWINGS

The invention and its mode of operation will be more clearly understood from the following detailed description, when read with the appended drawings in which:

FIG. 7A depicts a rectangular slot arrangement; FIG. 7B depicts a round hole arrangement and FIG. 7C depicts a rectangular slot with two segments (one wide and one narrow) arrangement.

FIG. 8A depicts a parallelogrammical (rhombus) slot arrangement; FIG. 8B depicts a cross shaped slot arrangement.

FIG. 9A depicts a broad-to-narrow wall attachment and FIG. 9B a broad-to-broad wall attachment.

FIG. 10A depicts calibration using a 2-port vector network analyzer (VNA);

FIG. 10B depicts calibration using a 4-port VNA.

DETAILED DESCRIPTION OF THE INVENTION

Figure 1:
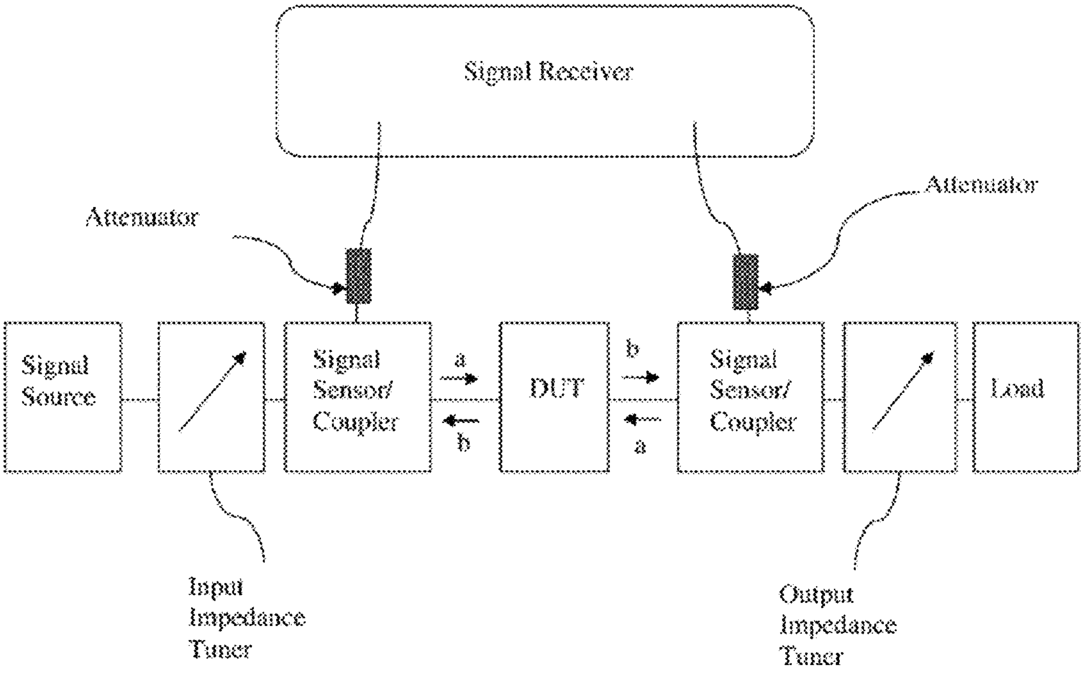
FIG. 1 depicts prior art, a signal (vector) measurement system using impedance tuners and bi-directional signal couplers.
Figure 2:
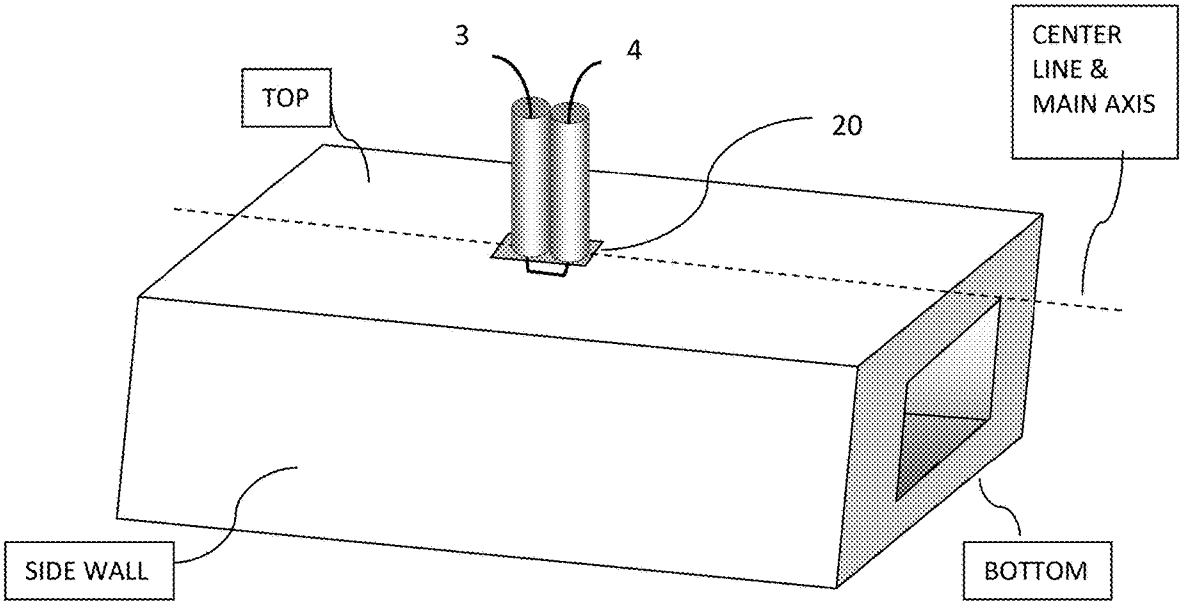
FIG. 2 depicts prior art, the concept of the electro-magnetic wire sensor type bi-directional signal coupler in a waveguide.
Figure 3:
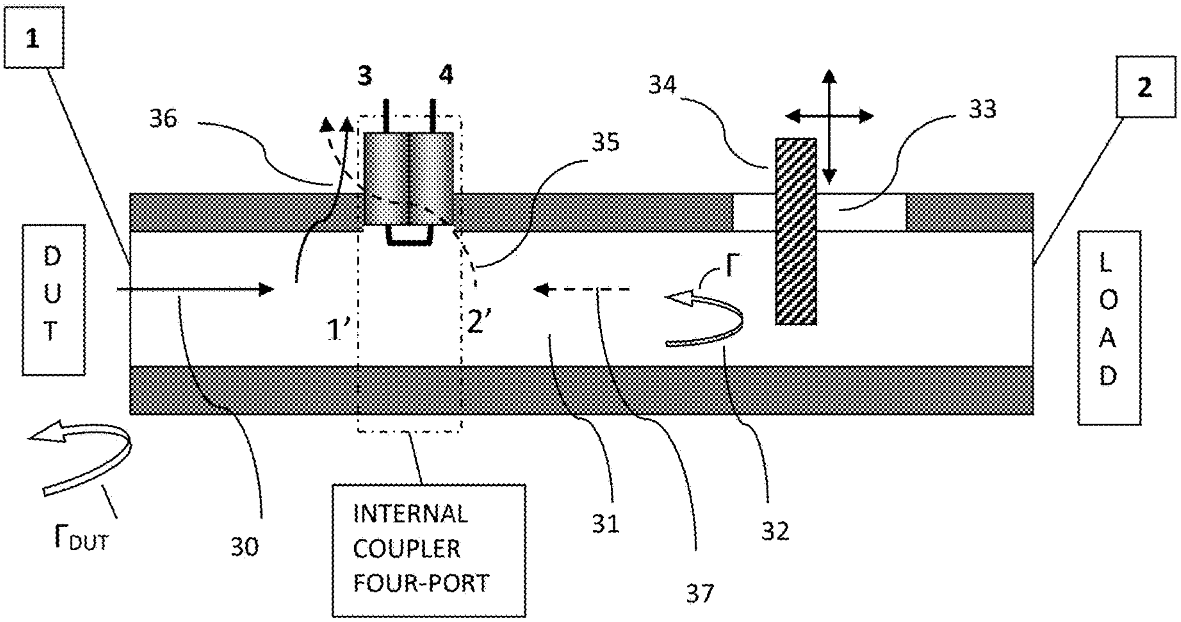
FIG. 3 depicts prior art, a waveguide load pull tuner-wire coupler combination.

Electro-magnetically coupled wire sensors for signal detection have been disclosed and used before (see ref. 5 and FIGS. 2 and 3). In prior art the electro-magnetic wire based signal couplers (terminating in ports 3, 4) are inserted in coaxial or waveguide 20 configuration (see ref. 4 and FIG. 2). However, there is a frequency limit to what can be accomplished using this technique, and that is the availability of microscopic size coaxial cables (diameter<0.8 mm), and adapters which are not available for frequencies above 140 GHz. For these higher frequencies the best (and only) solution are waveguide transmission lines and couplers. In the configuration of FIG. 3 a waveguide 31 tuner between ports 1 and 2 using a slot 33 and tuning probe 34 and an associated wire coupler with coupled ports 3 and 4: In this configuration the signal 30 exiting from the DUT is forward coupled 36 into the wire coupler and the reflected signal 32, 37 is reverse coupled into the same coupler before reaching the DUT to create the reflection factor Γout; this way the incident 30 and reflected 37 power waves are assessed by the signal analyzer connected to ports 3 (forward) and 4 (reverse) of the coupler. As said, this system cannot exceed 140 GHz but the modus of operation is valid, if the associated coupler and tuner are available.

Figure 4:
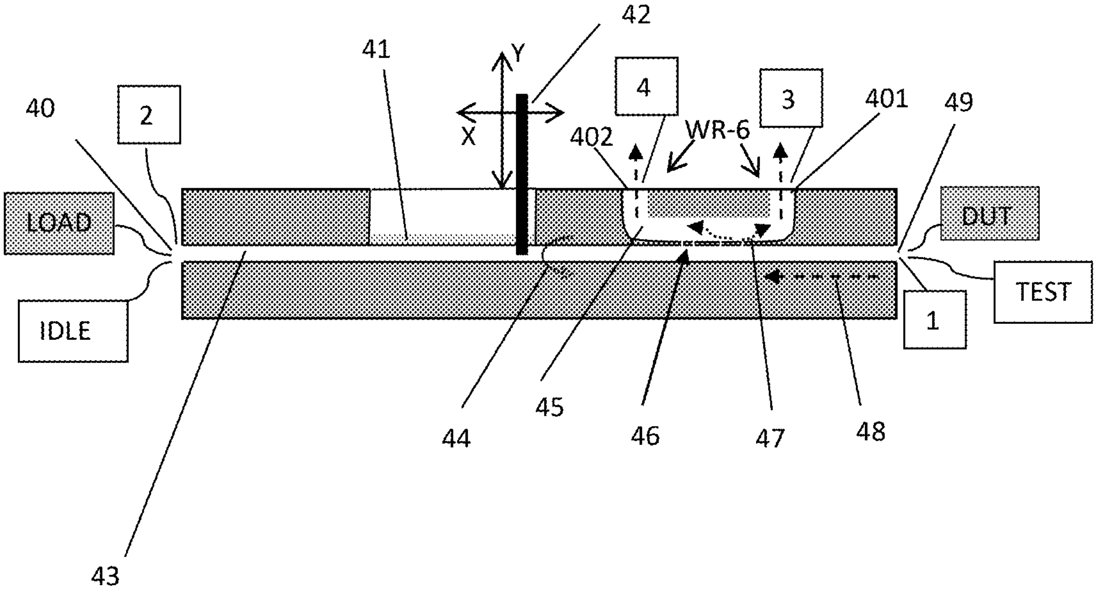
FIG. 4 depicts a waveguide load pull tuner-waveguide bi-directional coupler assembly.

The overall waveguide-based tuner-coupler (vector load-pull tuner) assembly, operational up to at least 330 GHz, is shown in FIG. 4. The waveguide 43 has an input (or test) port 49, connected with the DUT and an output (or idle port) 40 connected with the load. In case of source pull the same configuration applies, instead of the load the idle port is connected to the source; the test port is always connected to the DUT. The bi-directional waveguide coupler having ports 401 and 402 is inserted between the test port 49 and the impedance tuner, represented here by the conductive tuning probe 42, which is insertable vertically in-and-out of the slot 41 a to a multitude set of positions Y, and movable horizontally along the axis of the waveguide to a multitude of positions X, creating reflection factors covering a large portion of the reflection factor plan (Smith chart) at the test port. The tuning probe 42 creates a controlled reflection 44, which sends energy back to the DUT. The bi-directional coupler is made using a secondary waveguide section 45, which for the specific frequency range of 110-170 GHz uses the same standard rectangular size WR-6 (internal dimensions 0.065"×0.035" or 1.651×0.889 mm) as the main waveguide section 43.

The secondary waveguide 45 is separated from the main waveguide 43 by a thin common wall, which includes a number of communicating holes or openings 46 to allow the transfer of energy from the main to the secondary waveguide. The signal leaking through these holes excites electro-magnetic wave propagation into the secondary waveguide, the size and direction of which depends on the form of the openings and their mutual distance and configuration, as shown in FIGS. 7 and 8; a small portion of the signal 48, generated by the DUT, is coupled into the coupler 47; most of the energy is fed into the forward coupled port 401 and a lower amount into the (reverse) isolated port 402; the ratio of the two amounts is called "directivity" of the coupler and is a key characteristic of it. The higher the directivity the better the coupler; when the remaining signal 48 arrives at the tuning probe 42, it is reflected 44 and returns to the DUT. In this flow direction, though, port 402 is the coupled port and port 401 the isolated port of the coupler. This way the measurement system can detect and determine the incident and reflected power waves from and into the DUT and calculate the effective reflection factor created by the tuner at the test port 49, as well as the delivered power.

Figure 5:
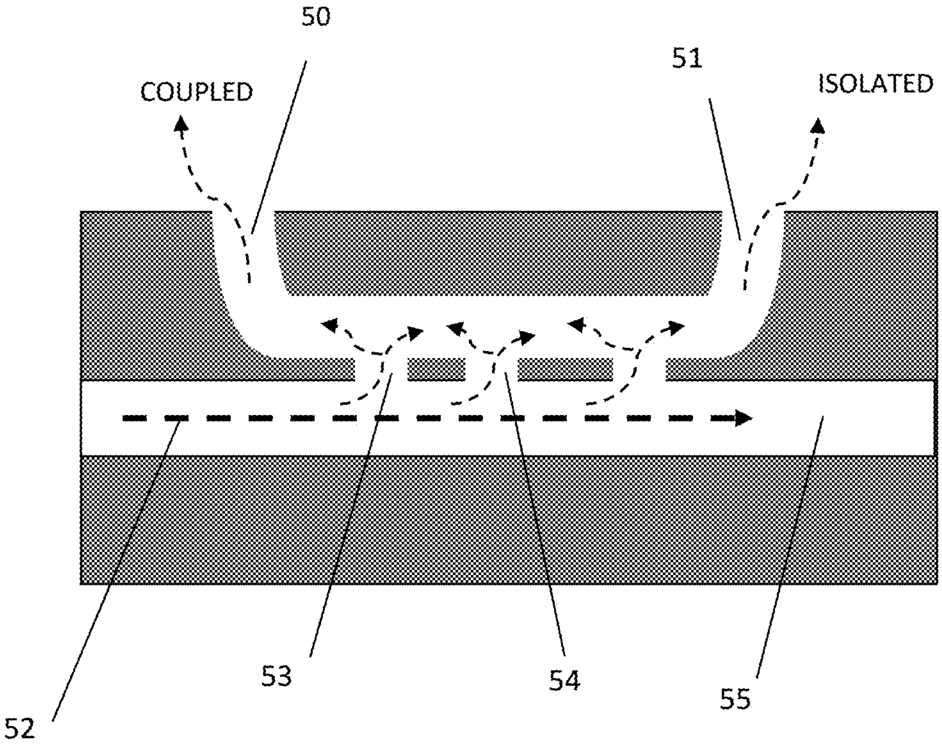
FIG. 5 depicts the detailed view of the waveguide-slot based bi-directional coupler; the communication holes between the waveguides can have multiple forms and configurations.

FIG. 5 shows the coupling mechanism in detail: typical dimensions of the slots 53, 54 and 72, 73 for the WR-6 tuner covering 110-170 GHz are (FIG. 7A): width 70 of 0.008" (0.2 mm) and length 71 of 0.025" (0.64 mm) or roughly 12% the width of the waveguide broad wall. If the waveguides are parallel but mounted vertical to each—other (FIG. 9A) then the slot width is about 22% wide of the waveguide narrow wall. The main signal 52, propagating through the main waveguide 55, couples into the adjacent waveguide through the holes 53, 54 . . . and exits through the coupled port 50 and the isolated port 51. This allows detecting the propagating waves by an attached vector network analyzer and process into power and reflection factors. The waveguide sections can also be mounted either perpendicular to each other or under an angle between zero (parallel) and 90 degrees (perpendicular); several prior art publications have demonstrated the advantages or shortcomings of the various configurations.

Figure 6:
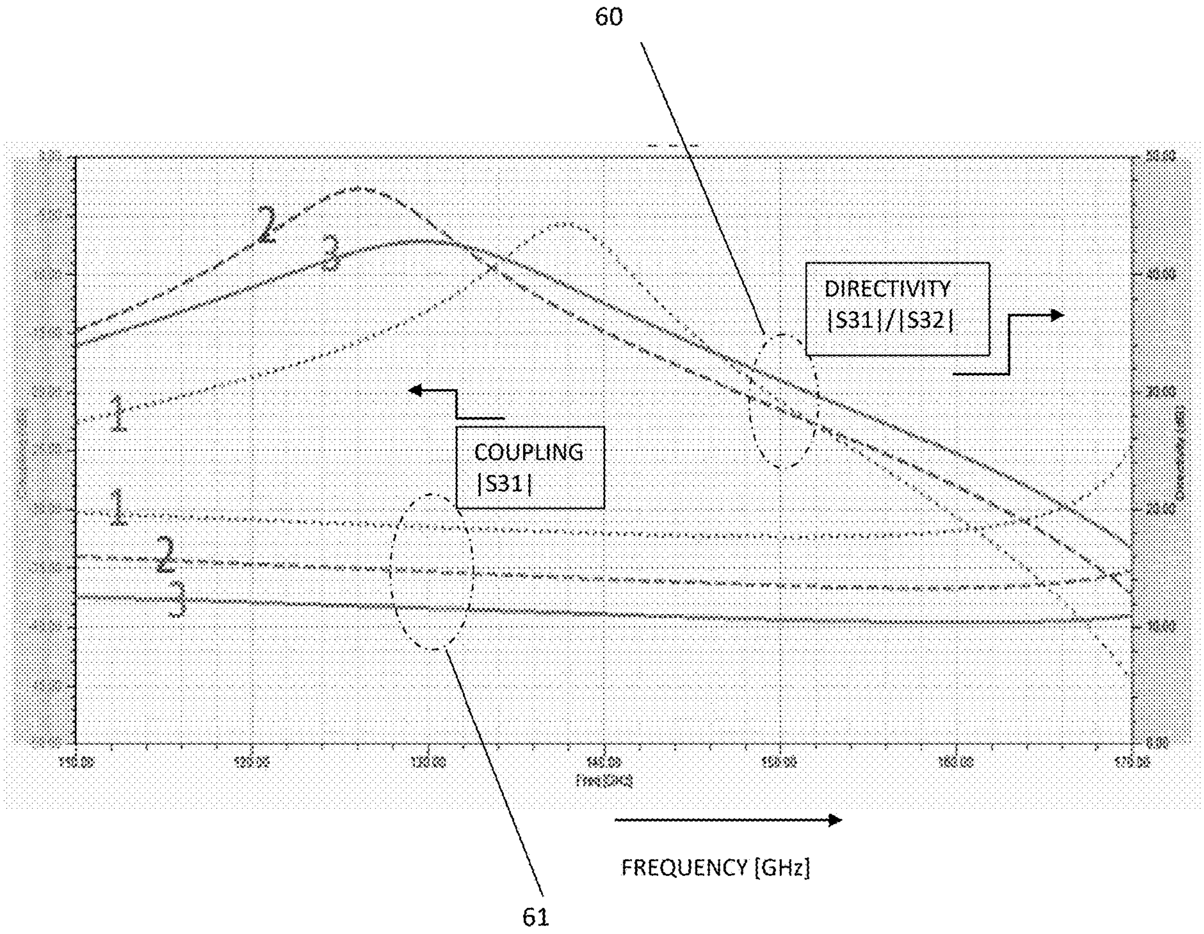
FIG. 6 depicts coupling factor and directivity of the waveguide bi-directional coupler in the frequency range 110-170 GHz for various dimensions and configurations of the slot-shaped communication holes between the waveguides.
Figure 7A:
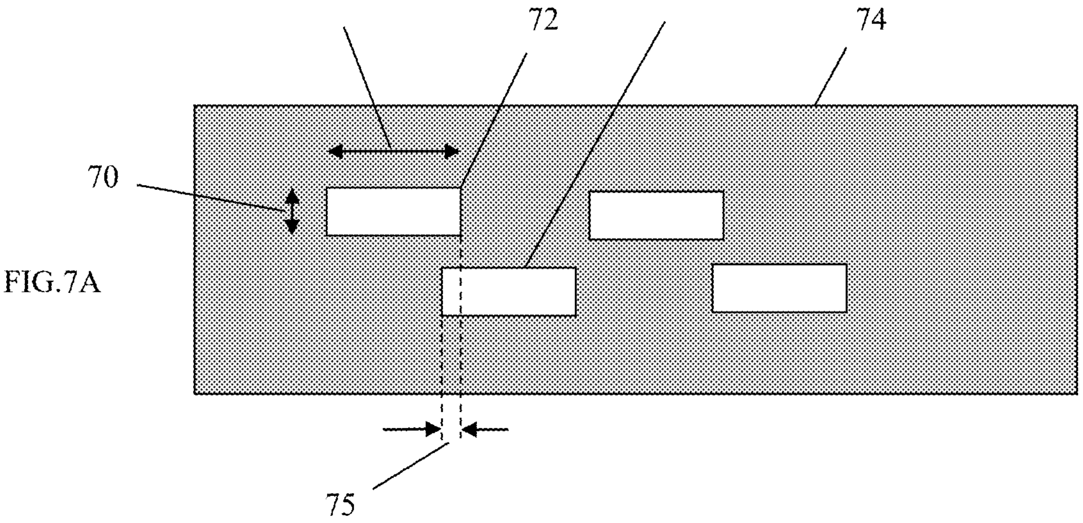
FIGS. 7A through 7C depict a number of evaluated communication holes.
Figure 7B:
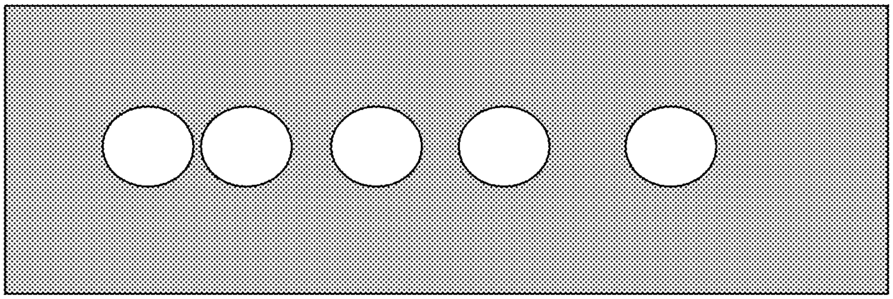
Figure 7C:
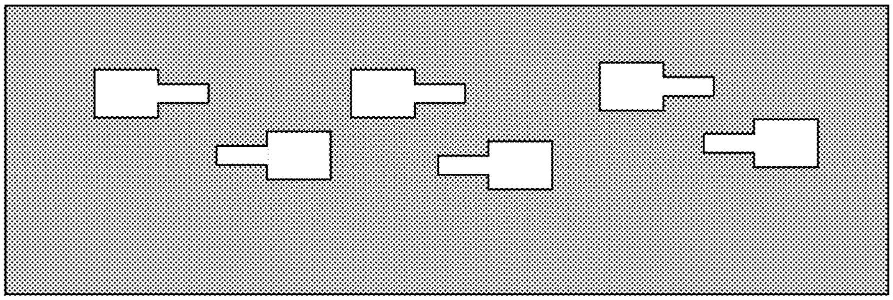
Figure 8A:
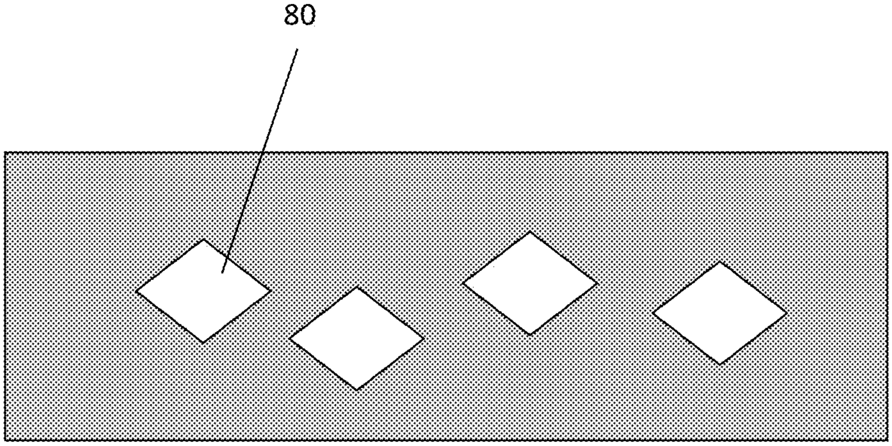
FIGS. 8A through 8B depict a further number of evaluated communication holes.
Figure 8B:
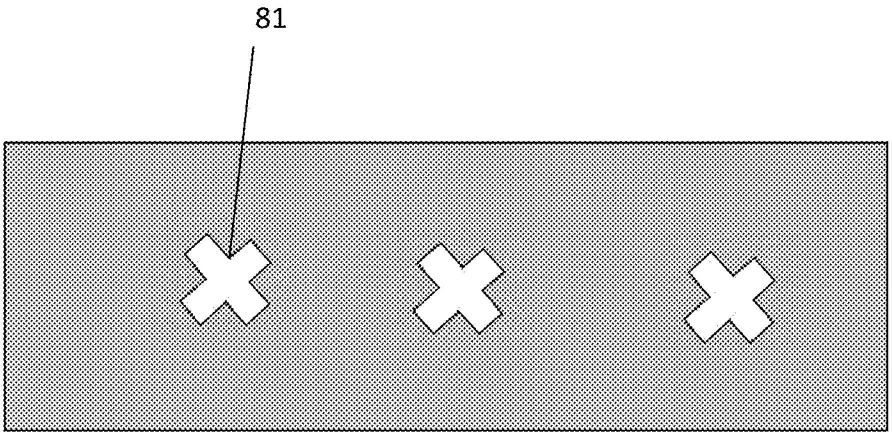
Figure 9A:
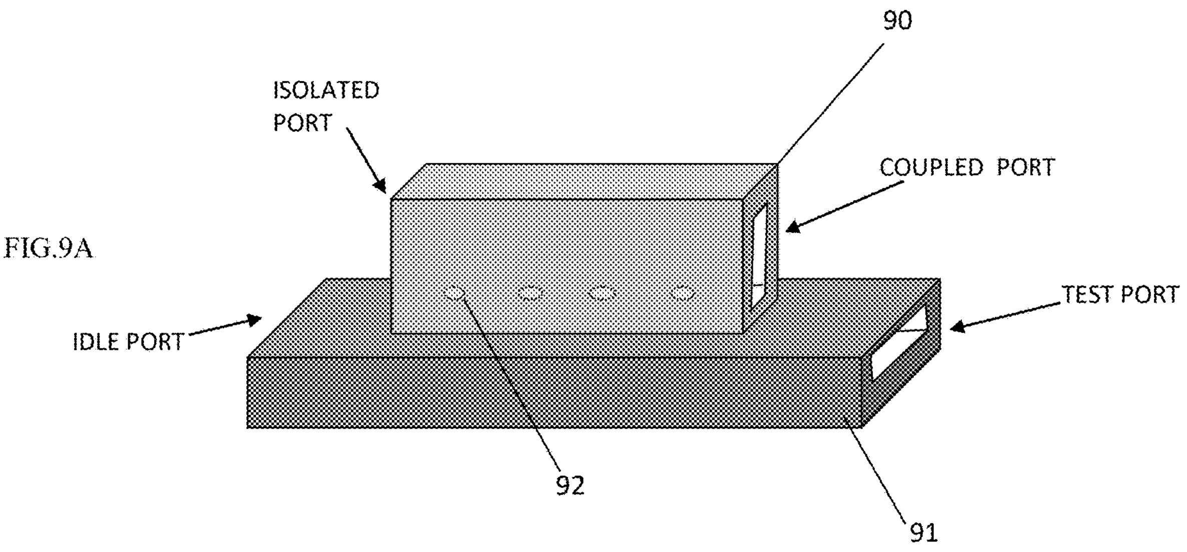
FIGS. 9A through 9B depict two possible waveguide attachments and coupling mechanisms.
Figure 9B:
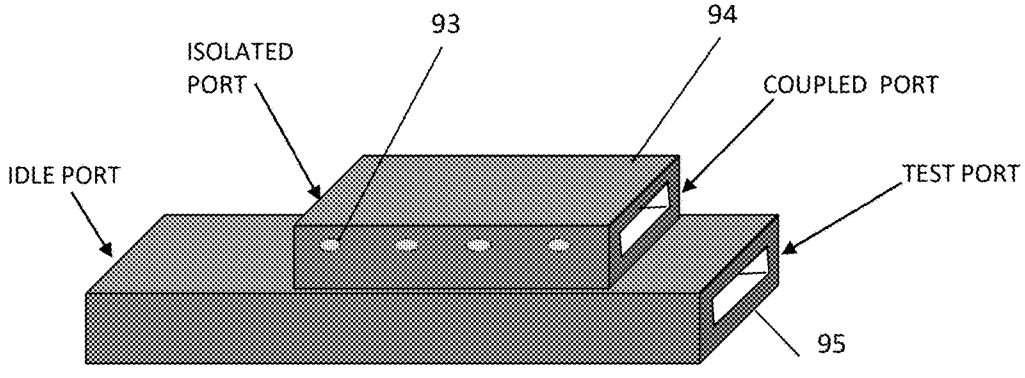

FIG. 6 shows coupling and directivity of a slot-based waveguide coupler per FIG. 7A in a mounting configuration 90, 91 per FIG. 9A for various 60, 61, size combinations 70, 71 and relative positionings 75 of the slots 72, 73 machined into the common waveguide wall 74 of the main and secondary waveguides. It is obvious that the highest coupling factor |S31| (coupling from port 1 to port 3, FIG. 3) and best frequency coverage in the 110-170 GHz range is associated with a directivity |S31|/|S32| compromise (|S32| is reverse coupling between reverse input port 2 and forward coupled port 3). Nonetheless the directivity results of the waveguide coupler are, in general, better than those of the wire coupler, per FIG. 2. FIGS. 9A and 9B show the two possible attachments of the two waveguides, the main waveguide 91, 95, which houses the tuner, and the secondary waveguide 90, 94, which houses the coupler, both communicating with various types and configurations of holes 92, 93 or slots 80, 81 (FIGS. 7A, B, C and 8A, B).

A more detailed operation and definitions of a coupler-tuner assembly valid for wire loop based and for slot-based waveguide couplers is shown in FIG. 3: the waveguide transmission line 31 has an input or test port 1 to which the DUT is connected, and an output port 2 connected to the load. The signal 30 flows from the DUT to the load. At the internal coupler port 1' a small portion of the signal (typically 1% or less) is forward coupled 36 into the coupled port 3 of the signal coupler; the remaining signal power continues along the tuner section and is reflected 32 at the tuning probe 34, which is inserted and manipulated inside the slot 33. This reflected signal 37 reaches the wire coupler and leaks back 35 into the coupled port 3 and is added to the original forward coupled signal 36; accurate measurement through the coupler requires accounting for this phenomenon. This leakage phenomenon leads to the following relation for the effective coupling factor C31'(Γ) between ports 1' and 3:

$$C31'(\Gamma)=S31'+S41'*S21'*\Gamma/(1-\Gamma*S22')\approx S31'+S41'*\Gamma \qquad \{eq.1\}$$

This simply means two things: a) that at Γ=0 the coupling is equal to the s-parameter S31' and b) that for medium to low directivity S31'/S41'=S31'/S32' the presence of Γ must be corrected for (see ref. 2).

It would be possible to apply eq. 1 to correct C31', if S31' and Γ were known. But in the integrated assembly, not only the real requirement is the external coupling factor C31 and not the internal C31', but also both the internal S31' and Γ are unknown and cannot be measured. The low insertion loss of the waveguide might tempt one to estimate, with acceptable accuracy, the effective amplitude of |S31'| and |Γ|, but, since all signals dealt with here are vectors having amplitude and phase, absence of phase information is unacceptable. Therefore, a different method must be found yielding the much-needed information, i.e., an adequate system calibration.

Calibration means prior characterization of a measurement instrument, or device, and saving the data in a way that can be recalled and referred to later. Impedance tuners, in general, are calibrated by measuring their two-port s-parameters from the input (test) port to the output (idle) port for a multitude of tuning probe positions, ideally the test port reflection factor S11 covering the whole or a large part of the reflection factor plan (Smith Chart), then save and recall the data (see ref. 6). The quantity of interest in the particular case of the couple-tuner assembly of FIG. 4 is, beyond the reflection factor S11 and tuner loss $(1-|S11|^2)/|S21|^2$, the coupling and isolation factor C31 as a function of the reflection factor Γ, 44 as shown in eq. 1. As already explained, because the internal coupler ports 1', 2' (FIG. 3) and the value of Γ at its reference plane are inaccessible, a direct characterization of the internal coupler four-port (FIG. 5) is impossible. But this is irrelevant. What the measurement system needs to measure is the power "generated by" the DUT and the reflection factor "seen by" the DUT. This can be done at port 1 without further knowledge of the internal mechanism of the assembly. By measuring four-port s-parameters Sij=S11, S12 . . . to S44 between the external ports 1 to 4 of the assembly as a function of the tuning probe positions, the whole system is characterized and calibrated. This line of thought is valid but not obvious, as a first reaction would be to characterize the coupler and tuner separately and compute the combination using theory as described by eq. 1. However, by scrutinizing the real requirement, we reach the conclusion that this, impossible, step is not even required.

Figure 10A:
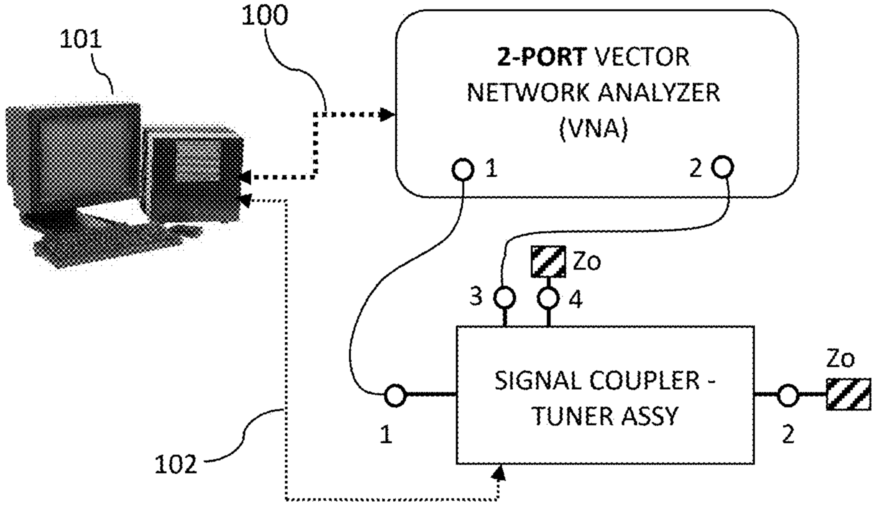
FIGS. 10A through 10B depict tuner-coupler (vector load pull tuner) assembly calibration setups.
Figure 10B:
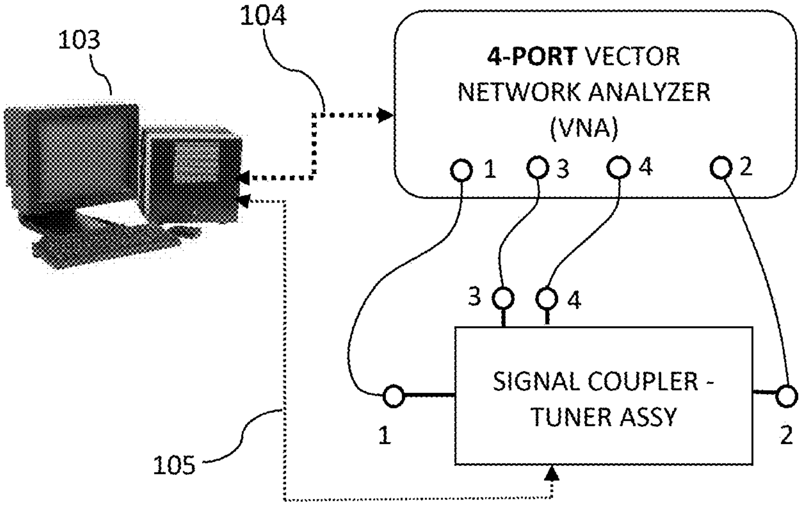
Figure 11:
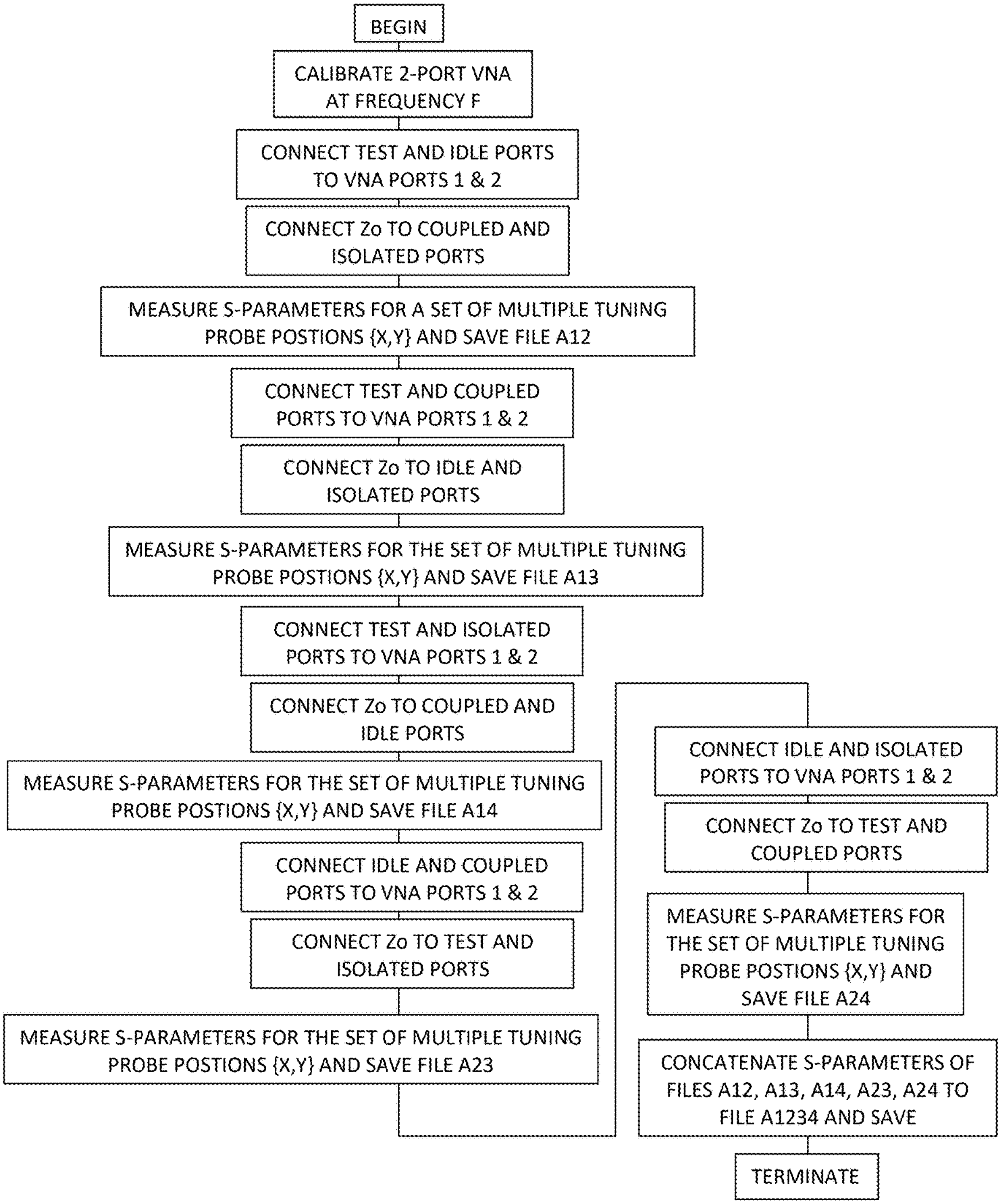
FIG. 11 depicts calibration flowchart of vector load pull tuner assembly using 2-port vector network analyzer.
Figure 12:
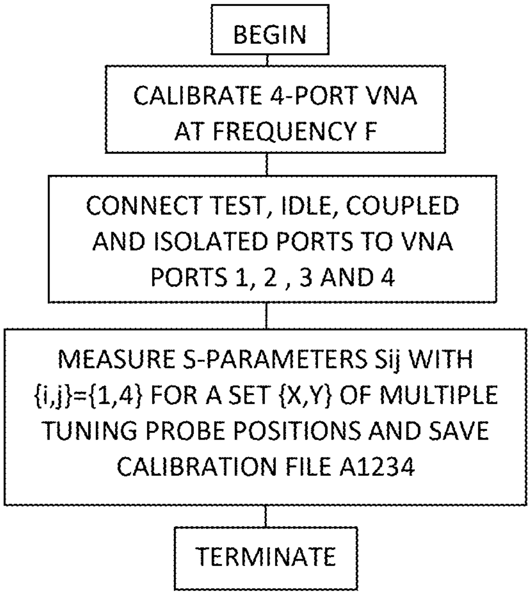
FIG. 12 depicts calibration flowchart of vector load pull tuner assembly using 4-port vector network analyzer.

Tuner calibration requires a pre-calibrated vector network analyzer (VNA) (see ref. 7 and FIGS. 10A and 10B), connected using digital cables 100, 104 and controlled by a system controller 101, 103 which also controls 102, 105 the tuner of the signal coupler tuner assembly. There are two basic types of VNA, 2-port VNA's having ports 1 and 2 and 4-port VNA's having ports 1 to 4; the difference is the internal duplication and multiplexing of signal measurement capability; when using a 4-port VNA (FIG. 12) the calibration is simpler, because the four ports 1 to 4 of the coupler-tuner assembly are directly connected to the corresponding VNA ports and the 4-port s-parameters (between two ports at a time internally switched) are measured and saved in one operation as a function of a user selected multitude of tuning probe positions and saved in a calibration file A1234 containing 6 sets of two-port s-parameters per tuning probe position: [Aij(X,Y)] for {i,j}={1,4} and i≠j, wherein [Aij] are matrices comprising four complex s-parameters each: [Aij]=[S11.ij,S12.ij,S21,ij,S22.ij]. When using a simpler 2-port VNA (FIG. 11), the calibration procedure becomes more tedious, because each time two of the four coupler-tuner assembly ports are connected to the VNA ports while the other two must be terminated with Zo (50Ω). In fact, s-parameters (see ref. 2) between the coupled and isolated ports 3 and 4 are not required for the operation, since these two ports are always Zo terminated and there is no signal power reflected to falsify the measurement. In summary a 4-port VNA requires connecting and measuring once, whereas a 2-port VNA (FIG. 11) requires connecting five, instead of six, times ({i-j}={1-2, 1-3, 1-4, 2-3, 2-4}) two of the tuner-coupler assembly ports with ports 1 and 2 of the VNA, each time terminating the other two ports with Zo, measuring two-port s-parameters for the same set of tuning probe settings and saving in corresponding [Aij] matrices in associated calibration files Aij. It is important that in this case the set of tuning probe positions is always the same. In the end the s-parameters of the Aij files are concatenated to a total A1234 calibration file including 5 sets of four s-parameters to a total of 20 s-parameter sets. In the case of a 4-port VNA, s-parameter measuring and also saving s-parameters between ports 3 and 4 is a free bonus that does not cost considerable extra time. Most of the inconvenience when using 2-port VNA is the connecting disconnecting time and the 5-fold longer tuning probe positioning and measuring, in addition to unavoidable mechanical repeatability errors in positioning and re-positioning the tuning probe.

Obvious alternatives of the disclosed embodiments of the slot-based waveguide coupler integrated with a waveguide tuner for sub-THz frequency vector load pull shall not impede on the reach of the invention. Obviously modified alternatives or re-arranged algorithms for calibration and for arranging the internal reference planes of the assembly shall not impede on the invention itself.

What is claimed is:

1. A waveguide vector load pull tuner comprising:

a four-port assembly of a waveguide load pull tuner and a bi-directional waveguide signal coupler, wherein the waveguide load pull tuner comprises:

a main rectangular waveguide having an input (test) port, an output (idle) port, a slot along a longitudinal axis of the main waveguide, and a remotely controlled conductive tuning probe, insertable perpendicularly into the slot between a state of withdrawal and a state of maximum penetration and movable inside the slot along the main waveguide over at least one half of a wavelength at a lowest frequency of operation of the waveguide vector load pull tuner, and wherein the bi-directional waveguide signal coupler comprises:

a secondary rectangular waveguide terminating at a coupled and an isolated port touching the main waveguide at a shared wall region and communicating electro-magnetically with the main waveguide via a number of holes traversing the shared wall region of the main and the secondary waveguides, and wherein the slot of the main waveguide, in which the tuning probe penetrates, is placed between the idle port and the holes traversing the shared wall region and a calibration method of the waveguide vector load pull tuner using a two-port vector network analyzer (VNA);

and a calibration method of the waveguide vector load pull tuner using a four-port vector network analyzer (VNA);

said calibration methods generating and saving s-parameters of the vector load pull tuner four-port assembly as a function of frequency and a multitude of horizontal and vertical positions of the tuning probe.

2. The waveguide vector load pull tuner of claim 1, wherein the main and the secondary waveguides have a rectangular cross section with two broad walls and two narrow walls, and wherein a broad wall of the secondary waveguide is touching a broad wall of the main waveguide.

3. The waveguide vector load pull tuner of claim 1, wherein the main and the secondary waveguides have a rectangular cross section with two broad walls and two narrow walls, and wherein a narrow wall of the secondary waveguide is touching a broad wall of the main waveguide section.

4. The waveguide vector load pull tuner of claim 1, wherein the holes traversing the shared wall region of the main and the secondary waveguides are round.

5. The waveguide vector load pull tuner of claim 1, wherein the holes traversing the shared wall region of the main and the secondary waveguides are rectangular slots.

6. The waveguide vector load pull tuner of claim 1, wherein the holes traversing the shared wall region of the main and the secondary waveguides are parallelogram slots.

7. The waveguide vector load pull tuner of claim 1, wherein the holes traversing the shared wall region of the main and the secondary waveguides are rectangular polygon slots having a wide section and a narrow section.

8. The waveguide vector load pull tuner of claim 1, wherein the holes traversing the common wall region of the main and the secondary waveguides are slots having the shape of a cross.

9. The calibration method for the waveguide vector load pull tuner as in claim 1, using a two-port vector network analyzer (VNA) having ports 1 and 2, pre-calibrated at a frequency F, comprising the following steps:

a) the test and idle ports are connected to ports 1 and 2 of the VNA while the coupled and isolated ports are terminated with characteristic impedance (Zo);

b) two-port s-parameters Sij for {i, j}={1,2} are measured at the frequency F for a multitude M=N×K of N horizontal (X) and K vertical (Y) positions of the tuning probe and saved in file A12 in the format Sij(X,Y);

c) the test port and the coupled port are connected to ports 1 and 2 of the VNA while the idle port and the isolated port are terminated with characteristic impedance (Zo);

d) two-port s-parameters Sij for {i, j}={1,2} are measured at the frequency F for the multitude M=N×K of the N horizontal (X) and the K vertical (Y) positions of the tuning probe and saved in file A13 in the format Sij (X,Y);

e) the test port and the isolated port are connected to ports 1 and 2 of the VNA while the idle port and the coupled port are terminated with characteristic impedance (Zo);

f) two-port s-parameters Sij for {i, j}={1,2} are measured at the frequency F for the multitude M=N×K of the N horizontal (X) and the K vertical (Y) positions of the tuning probe and saved in file A14 in the format Sij (X,Y);

g) the idle port and the coupled port are connected to ports 1 and 2 of the VNA while the test port and the isolated port are terminated with characteristic impedance (Zo);

h) two-port s-parameters Sij for {i, j}={1,2} are measured at the frequency F for the multitude M=N×K of the N horizontal (X) and the K vertical (Y) positions of the tuning probe and saved in file A23 in the format Sij (X,Y);

i) the idle port and the isolated port are connected to ports 1 and 2 of the VNA while the test port and the coupled port are terminated with characteristic impedance (Zo);

j) two-port s-parameters Sij for {i, j}={1,2} are measured at the frequency F for the multitude M=N×K of the N horizontal (X) and the K vertical (Y) positions of the tuning probe and saved in file A24 in the format Sij (X,Y);

k) the coupled port and the isolated port are connected to ports 1 and 2 of the VNA while the test port and the idle port are terminated with characteristic impedance (Zo);

l) Two-port s-parameters Sij for {i, j}={1,2} are measured at the frequency F for the multitude M=N×K of the N horizontal (X) and the K vertical (Y) positions of the tuning probe and saved in file A34 in the format Sij (X,Y);

m) s-parameters Sij (X,Y) in files A12, A13, A14, A23, A24 and A34 are concatenated creating a calibration file A1234 of the vector load pull tuner.

10. The calibration method for the vector load pull tuner as in claim 1, using a four-port vector network analyzer (VNA) having ports 1, 2, 3 and 4, pre-calibrated at a frequency F, comprising the following steps:

a) connect the test port to port 1, the idle port to port 2, the coupled port to port 3 and the isolated port to port 4;

b) measure six sets [Aab], where {a,b}={1,2,3,4} and a≠b, A12, A13, A14, A23, A24 and A34, of two-port s-parameters Sij with {i,j}={1,2} at the frequency F and a multitude M=N×K of N horizontal (X) and K vertical (Y) positions of the tuning probe and save in a calibration file A1234 in a format Sij (X,Y).

11. The waveguide vector load pull tuner of claim 1, wherein the main waveguide and the secondary waveguide are mounted parallel to each other.

12. The waveguide vector load pull tuner of claim 1, wherein the main waveguide and the secondary waveguide are mounted perpendicular to each other.

13. The waveguide vector load pull tuner of claim 1, wherein the main waveguide and the secondary waveguide are mounted at an angle between zero and 90 degrees to each other.

* * * * *